(12) United States Patent
Habuta et al.

(10) Patent No.: US 7,440,682 B2
(45) Date of Patent: Oct. 21, 2008

(54) ELECTRONIC-ALBUM DISPLAYING SYSTEM, ELECTRONIC-ALBUM DISPLAYING METHOD, REMOTE CONTROLLER, MACHINE READABLE MEDIUM STORING REMOTE CONTROL PROGRAM, SCHEDULE GENERATING DEVICE, AND MACHINE READABLE MEDIUM STORING SCHEDULE GENERATING PROGRAM

(75) Inventors: Shizuo Habuta, Tokyo (JP); Akira Yoda, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 720 days.

(21) Appl. No.: 11/115,184

(22) Filed: Apr. 27, 2005

(65) Prior Publication Data

US 2005/0259949 A1 Nov. 24, 2005

(30) Foreign Application Priority Data

Apr. 28, 2004 (JP) ............................. 2004-134750

(51) Int. Cl.
*H04N 5/00* (2006.01)
*H04N 5/91* (2006.01)
(52) U.S. Cl. ......................................... 386/125; 386/83
(58) Field of Classification Search ................. 386/125, 386/83, 46, 45, 92; 348/14.05, 211.99, 734
See application file for complete search history.

(56) References Cited

U.S. PATENT DOCUMENTS

2002/0184626 A1 * 12/2002 Darbee et al. ................. 725/39
2004/0240858 A1 * 12/2004 Miyazaki ..................... 386/98

FOREIGN PATENT DOCUMENTS

JP 2003-259303 A 9/2003

* cited by examiner

*Primary Examiner*—Robert Chevalier
(74) *Attorney, Agent, or Firm*—Birch, Stewart, Kolasch & Birch, LLP

(57) ABSTRACT

Images included in an electronic album are displayed as a slide show with the configuration and sequence different from the configuration and sequence on the video stream that has been created already. There is provided an electronic-album displaying system that displays an electronic album including a plurality of images. The electronic-album displaying system includes a video stream storing unit operable to store a video stream including the plurality of images as frame images, a playback unit operable to play the video stream, a remote controller operable to remotely control the playback unit byway of radio communication, and a display unit operable to display the video stream played by the playback unit, in which the remote controller includes a schedule storing unit that stores a schedule by which at least some images among the plurality of images are played, and a remote controlling unit that remotely controls the playback unit in order to play each of at least some images according to the schedule.

14 Claims, 6 Drawing Sheets

132

| CHAPTER | PLAYBACK DURATION |
|---------|-------------------|
| PTT3 | 3 SECONDS |
| PTT8 | 2 SECONDS |
| PTT9 | 2 SECONDS |
| PTT5 | 3 SECONDS |
| ⋮ | ⋮ |

FIG. 2

| CHAPTER | THUMBNAIL IMAGE |
|---|---|
| PTT1 | ~200 |
| PTT2 |  |
| PTT3 |  |
| PTT4 |  |
| ... | ... |

FIG. 4

ELECTRONIC-ALBUM DISPLAYING SYSTEM, ELECTRONIC-ALBUM DISPLAYING METHOD, REMOTE CONTROLLER, MACHINE READABLE MEDIUM STORING REMOTE CONTROL PROGRAM, SCHEDULE GENERATING DEVICE, AND MACHINE READABLE MEDIUM STORING SCHEDULE GENERATING PROGRAM

This patent application claims priority from a Japanese Patent Application No. 2004-134750 filed on Apr. 28, 2004, the contents of which are incorporated herein by reference.

BACKGROUND OF THE INVENTION

1. Field of the Invention

The present invention relates to an electronic-album displaying system, an electronic-album displaying method, a remote controller, a machine readable medium storing a remote control program, a schedule generating device, and a machine readable medium storing a schedule generating program. More particularly, the present invention relates to an electronic-album displaying system and an electronic-album displaying method of displaying an electronic album including a plurality of images, a remote controller, a machine readable medium storing a remote control program, a schedule generating device, and a machine readable medium storing a schedule generating program that are used in the electronic-album displaying system.

2. Description of Related Art

Recently, a digital camera becomes widespread rapidly, and thus a user of the digital camera has a lot of digital image data that are not printed. Moreover, there have been provided services for digitizing a negative film or a printed photography and generating a digital image data. However, since information equipment such as a personal computer is required to see these digital image data, the controlling of the information equipment is not so simple.

Thus, the technique by which the user can see the digital image data by a slide show using a DVD player and the like by processing the digital image data with a video stream such as an MPEG2 format to make DVD-Video disks is known as disclosed, for example, in Japanese Patent Laid-Open No. 2003-259303.

However, according to the technique as described in Japanese Patent Laid-Open No. 2003-259303, the DVD-Video disk, which has been created already, cannot change a configuration and sequence of images that are displayed as the slide show. Thus, to display images with the other configuration and sequence, it is necessary that another DVD-Video disk is created from original digital image data. For this reason, although the user was not satisfied with the contents of the slide show by the created DVD-Video disk, there has been a problem that the user cannot change the contents easily.

SUMMARY OF THE INVENTION

Therefore, it is an object of the present invention to provide an electronic-album displaying system, an electronic-album displaying method, a remote controller, a machine readable medium storing a remote control program, a schedule generating device, and a machine readable medium storing a schedule generating program that can solve the foregoing problems. The above and other objects can be achieved by combinations described in the independent claims. The dependent claims define further advantageous and exemplary combinations of the present invention.

According to the first aspect of the present invention, there is provided an electronic-album displaying system that displays an electronic album including a plurality of images. The electronic-album displaying system includes: a video stream storing unit operable to store a video stream including the plurality of images as frame images; a playback unit operable to play the video stream; a remote controller operable to remotely control the playback unit by way of radio communication; and a display unit operable to display the video stream played by the playback unit, in which the remote controller includes: a schedule storing unit that stores a schedule by which at least some images among the plurality of images are played; and a remote controlling unit that remotely controls the playback unit in order to play each of at least some images according to the schedule.

The schedule storing unit may store information, which indicates playback sequence of at least some images and a position of each of at least some images in the video stream, as the schedule, and the remote controlling unit may remotely control the playback unit in order to sequentially change a playback position of the video stream on the playback unit into the position of each of at least some images according to the playback sequence. The schedule storing unit may store thereon playback duration, which is time for which the playback unit continues to play that image with respect to each of at least some images, as the schedule, and the remote controlling unit may remotely control the playback unit in order to temporarily pause the playback of video stream after that image has been played and also continue a pause state for the playback duration of that image with respect to each of at least some images.

The schedule storing unit may be exchangeably provided in the remote controller. The video stream storing unit may be a recording medium that is not rewritable, and the schedule storing unit may be a recording medium that is rewritable. The video stream storing unit may be a DVD-Video disk that stores the video stream in a MPEG2 format, and the playback unit may be a DVD-Video playback device that plays the DVD-Video disk. The schedule storing unit may store information, which indicates playback sequence of at least some images and a chapter in which each of at least some images is included, as the schedule, and the remote controlling unit may remotely control the playback unit in order to sequentially change a playback position of the video stream on the playback unit into the chapter position in which each of at least some images is included according to the playback sequence.

The video stream storing unit may further store information to indicate a position of each of the plurality of images on the video stream, and the electronic-album displaying system may further include a schedule generating device operable to generate the schedule based on the information to indicate the location of each of the plurality of images stored on the video stream storing unit. The video stream storing unit may further store information to indicate a chapter in which each of the plurality of images is included, and the electronic-album displaying system may further include a schedule generating device operable to generate the schedule based on the information to indicate the chapter in which each of the plurality of images is included.

According to the second aspect of the present invention, there is provided an electronic-album displaying method of displaying an electronic album including a plurality of images. The electronic-album displaying method includes: playing a video stream including the plurality of images as frame images by means of a playback unit; remotely controlling the playback unit by radio communication by means of a remote controller; and displaying the video stream played at the playback step, in which the remotely controlling step includes remotely controlling the playback unit in order to play each of at least some images according to a schedule that is stored on a schedule storing unit of the remote controller and by which at least some images among the plurality of images are played.

According to the third aspect of the present invention, there is provided a remote controller that remotely controls a playback unit playing a video stream by way of radio communication, in which the video stream includes a plurality of images as frame images, and the remote controller includes: a schedule storing unit that stores a schedule by which at least some images among the plurality of images are played; and a remote controlling unit that remotely controls the playback unit in order to play each of at least some images according to the schedule.

According to the fourth aspect of the present invention, there is provided a machine readable medium storing a remote control program that causes a remote controller to remotely control a playback unit playing a video stream by way of radio communication, in which the video stream includes a plurality of images as frame images, and the program causes the remote controller to act as the remote controller including: a schedule storing unit that stores a schedule by which at least some images among the plurality of images are played; and a remote controlling unit that remotely controls the playback unit in order to play each of at least some images according to the schedule.

According to the fifth aspect of the present invention, there is provided a schedule generating device that generates a schedule by which a video stream stored on a video stream storing unit is played, in which the video stream includes a plurality of images as frame images, and a remote controller includes a schedule storing unit that stores the schedule by which at least some images among the plurality of images are played, the video stream storing unit further stores information to indicate a position each of the plurality of images on the video stream, and the schedule generating device generates the schedule that should be stored on the schedule storing unit and by which at least some images among the plurality of images are played without changing the video stream based on the information that is stored on the video stream storing unit and indicates the position each of the plurality of images.

According to the sixth aspect of the present invention, there is provided a machine readable medium storing a schedule generating program that causes a computer to act as a schedule generating device that generates a schedule by which a video stream stored on a video stream storing unit is played, in which the video stream includes a plurality of images as frame images, and a remote controller includes a schedule storing unit that stores the schedule by which at least some images among the plurality of images are played, the video stream storing unit further stores information to indicate a position each of the plurality of images on the video stream, and the schedule generating program causes the computer to act as the schedule generating device that generates the schedule that should be stored on the schedule storing unit and by which at least some images among the plurality of images are played without changing the video stream based on the information that is stored on the video stream storing unit and indicates the position each of the plurality of images.

According to the present invention, images included in an electronic album can be displayed as a slide show with the configuration and sequence different from the configuration and sequence on the video stream that has been created already.

The summary of the invention does not necessarily describe all necessary features of the present invention. The present invention may also be a sub-combination of the features described above.

BRIEF DESCRIPTION OF THE DRAWINGS

The above and other objects and features and advantages of the present invention will become more apparent from the following description of the presently preferred exemplary embodiments of the invention taken in conjunction with the accompanying drawings, in which:

FIG. 2 is a view exemplary showing a schedule stored on a memory card according to an embodiment of the present invention;

FIG. 4 is a view exemplary showing information stored on a DVD-Video disk according to an embodiment of the present invention;

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
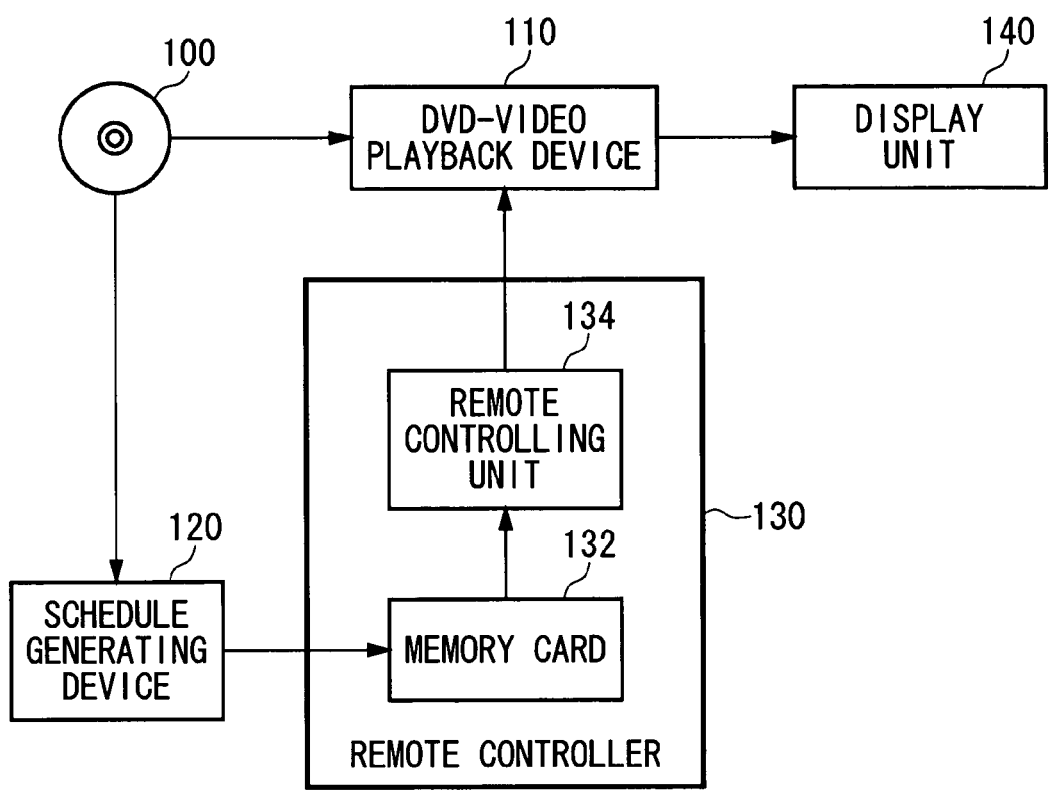
FIG. 1 is a block diagram exemplary showing a configuration of an electronic-album displaying system according to an embodiment of the present invention.

FIG. 1 is a block diagram exemplary showing a configuration of an electronic-album displaying system 10 according to an embodiment of the present invention. The electronic-album displaying system 10 displays an electronic album including a plurality of images as a slide show by which the plurality of images is sequentially shown. The electronic-album displaying system 10 includes a DVD-Video disk 100, a DVD-Video playback device 110, a computer 120, a remote controller 130 having a memory card 132 and a remote controlling unit 134, and a display unit 140.

The DVD-Video disk 100 is an example of a video stream storing unit according to the present invention, and stores thereon a video stream including the plurality of images included in the electronic album as frame images. Particularly, the video stream has a MPEG2 format, and includes the plurality of images included in the electronic album as the frame images of which each frame image continues for a predetermine time, e.g., three seconds. For example, the video stream may include each of the plurality of images included in the electronic album as "I picture" that is a frame image capable of being played without using the other frame images of the MPEG2 format, and also include "B picture" or "P picture", of which a difference is zero, in the I picture as a frame image that continues for the predetermined time. Moreover, the video stream may include frame images to indicate a transition effect such as a wipe in the location where the images is respectively replaced in addition to the frame images showing the plurality of images included in the electronic album, or may include frame images showing titles related to each image or the continuous images. Moreover, the video stream may define one or more continuous frame images showing that image as PTT (part of title), i.e., a chapter in DVD-Video standards.

Although the DVD-Video disk 100 may be any one of a recording medium such as DVD-ROM or DVD-R that is not rewritable and a recording medium such as DVD-RW that is rewritable, it is preferably a recording medium that is not rewritable to reduce the user's chance of removing the recorded video stream by mistake. The DVD-Video disk 100 maybe created by, e.g., a service provider such as a processing laboratory by a requested form the user using negative films, printed photographs, and recording media of a digital camera that are provided by the user. Then, the user can play the created DVD-Video disk 100 to enjoy the electronic album as the slide show in which the plurality of images included in the electronic album is replaced and displayed according to a schedule that has been predetermined during creating the DVD-Video disk 100. Here, the schedule includes information to indicate a configuration of the images played and displayed as the slide show, sequence of the images played and displayed, and time in which each of the images is played and displayed. In other words, the predetermined schedule means a schedule by which the plurality of images included in the electronic album is sequentially displayed for time for which the frame images showing each image are continued according to the sequence in which the plurality of images is included in the video stream stored on the DVD-Video disk 100 as the frame images.

The object of the electronic-album displaying system 10 according to an embodiment of the present invention is to display the images included in the electronic album as the slide show with a schedule different from the predetermined schedule related to that video stream, even if the DVD-Video disk 100 for storing the video stream that is created to display the images included in the electronic album with the predetermined schedule is used.

The DVD-Video playback device 110 is, e.g., a DVD player, and plays a video stream stored on the DVD-Video disk 100 and outputs video signals showing the video stream to the display unit 140. Moreover, the DVD-Video playback device 110 may play an audio stream stored on the DVD-Video disk 100, and output audio signals showing the audio stream to the display unit 140. Moreover, the DVD-Video playback device 110 has a radio communication means such as an infrared optical receiver, and communicates with the remote controller 130 by radio. The DVD-Video playback device 110 is an example of a playback unit in the present invention.

The schedule generating device 120 is, e.g., a personal computer, and generates a schedule of the slide show according to instructions of the user based on information stored on the DVD-Video disk 100. Then, the schedule generating device 120 records the generated schedule in the memory card 132.

The remote controller 130 remotely controls the DVD-Video playback device 110 by means of radio communication such as infrared communication. The memory card 132 is a rewritable recording medium that is exchangeably provided in the remote controller 130, and stores a schedule by which at least some images among the plurality of images included in the video stream stored on the DVD-Video disk 100 are played. For example, the memory card 132 may have a non-volatile memory such as a flash memory, and be inserted into a slot provided in the remote controller 130 to be exchangeably provided in the remote controller 130. The memory card 132 is an example of a schedule storing unit in the present invention.

The remote controlling unit 134 remotely controls the DVD-Video playback device 110 by means of radio communication such as infrared communication in order to play each of at least some images among the plurality of images included in the electronic album according to the schedule stored on the memory card 132. For example, the remote controlling unit 134 transmits infrared signals to the DVD-Video playback device 110 using an infrared LED to remotely control the DVD-Video playback device 110. Here, the controlling of the DVD-Video playback device 110 performed by the remote controlling unit 134 means, e.g., start of the playback, stop of the playback, pause of the playback, change of the playback position to the next chapter, change of the playback position to the previous chapter, change of the playback position to any chapter, and so on.

Generally, when the DVD-Video playback device 110 is remotely controlled by infrared communication, communication messages of the DVD-Video playback devices 110 are different from one another with respect to each model of the DVD-Video playback devices 110. Thus, when the remote controlling unit 134 is provided to be able to correspond to various types of the DVD-Video playback devices 110 not to correspond to specific type of the DVD-Video playback device 110, the remote controlling unit 134 may previously store the communication messages such as waveforms of infrared signals, e.g., every model of the DVD-Video playback devices 110 and every control type of that model and transmit an infrared signal of the waveform according to the model of the DVD-Video playback device 110 designated by the user so as to control various types of the DVD-Video playback devices 110. In addition, the remote controlling unit 134 may remotely control the DVD-Video playback device 110 by the other radio communication such as the Bluetooth instead of infrared communication.

The display unit 140 is, e.g., a TV receiver including an outside video-input terminal, and receives and displays a video signal to indicate a video stream that is played by the DVD-Video playback device 110. Moreover, the display unit 140 may receive an audio signal to indicate an audio stream that is played by the DVD-Video playback device 110 to output it using a speaker and the like.

According to the electronic-album displaying system 10 of an embodiment of the present invention, when the video stream stored on the DVD-Video disk 100 is played by the DVD-Video playback device 110, since the remote controller 130 remotely controls the DVD-Video playback device 110, the slide show can be displayed with a schedule different from the predetermined schedule related to that video stream, particularly a schedule stored on the memory card 132.

Moreover, in the conventional electronic-album displaying system, when hoping to display the slide show with a schedule different from the schedule related to the video stream stored on the DVD-Video disk 100, it is necessary that the user needs to have a processing laboratory generate a new DVD-Video disk based on the new schedule or creates new DVD-Video disk her/himself. However, by using the remote controller 130 according to an embodiment of the present invention, since the slide show can be displayed with a schedule different from the predetermined schedule while using the DVD-Video disk 100 and a general home electric equipment such as a DVD player or a TV receiver, it is possible to reduce a complicated process to be done by the user.

Moreover, according to the electronic-album displaying system 10 of an embodiment of the present invention, a mobile telephone terminal having a radio communication function such as an infrared communication function can be used as the remote controller 130. By doing so, it is possible to display the slide show with a schedule different from the predetermined schedule without purchasing the remote controller 130 separately.

Furthermore, according to the electronic-album displaying system 10 of an embodiment of the present invention, each of the plurality of users appreciating a slide show can have the remote controller 130. In this way, when playing a DVD-Video disk 100, it is possible to display the slide show by sequentially changing each of the schedules stored on the memory cards 132 inserted into the remote controllers 130 owned by each user.

In addition, a configuration of the electronic-album displaying system 10 is not limited to a configuration shown in the drawing and thus various changes may be made to the configuration shown in the drawing. For example, the video stream stored on the DVD-Video disk 100 may be a video stream with the other format such as an MPEG format or an MPEG4 format instead of a video stream with an MPEG2 format. Moreover, the DVD-Video disk 100 may be a recording medium such as an optical recording medium, a magnetic recording medium, a magneto-optical recording medium, a semiconductor recording medium based on the other formats or the other standards such as a VideoCD disk. In this case, the DVD-Video playback device 110 may be a playback device that can play the video stream by means of these recording media.

Moreover, the remote controller 130 may have the other exchangeable recording medium instead of the memory card 132, or may have a recording medium such as a nonvolatile memory that is not exchangeable instead of an exchangeable recording medium. Here, when the remote controller 130 has an exchangeable recording medium, the schedule generating device 120 may communicate with the remote controller 130 by means of wire communication or radio communication to store the generated schedule on that recording medium. Moreover, the remote controller 130 may has communication means for performing wire communication or radio communication, and thus acquire a schedule created by a creator of the DVD-Video disk 100 via a network such as an internet. In this way, the remote controller 130 may control the DVD-Video playback device 110 based on the acquired schedule to display a slide show based on the schedule.

FIG. 2 is a view exemplary showing a schedule stored on the memory card 132 according to an embodiment of the present invention. The memory card 132 stores information to indicate playback sequence of at least some images among the plurality of images included in the electronic album and a position of each of at least some images in the video stream, as the schedule of the slide show. Particularly, the memory card 132 stores information to indicate playback sequential of at least some images and a chapter in which each of at least some images is included as the schedule of the slide show. More particularly, the memory card 132 stores information to indicate a chapter in which each of the images is included, i.e., PTT in order of the slide show with respect to at least some images to be displayed as the slide show among the plurality of images included in the electronic album, as shown in the present drawing. For example, in the schedule shown in the present drawing, the image to be first displayed in the slide show is included in the third chapter as the frame image. Moreover, the memory card 132 may store playback time, e.g., from a predetermined position such as the head of the video stream to that image as information to indicate each position of at least some images instead of the information to indicate a chapter in which that image is included. Furthermore, the memory card 132 stores playback duration for which the DVD-Video playback device 110 continues to play that image, i.e., display time for which that image in the slide show is displayed, with respect to each of at least some images as the schedule of the slide show. For example, in the schedule shown in the present drawing, playback duration of the image to be first displayed in the slide show is three seconds.

Figure 3:
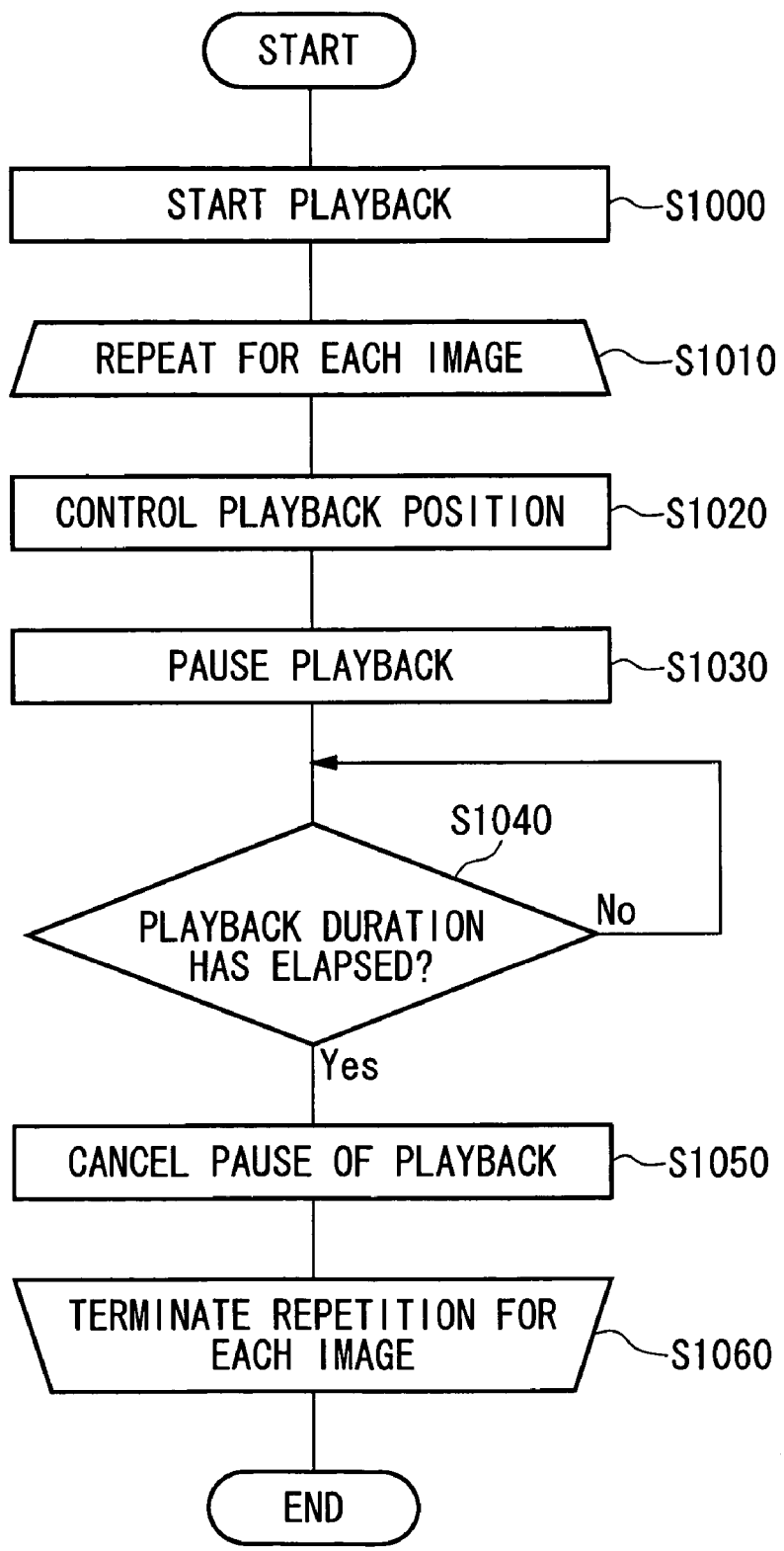
FIG. 3 is a flowchart exemplary showing a process flow in the electronic-album displaying system according to an embodiment of the present invention.

FIG. 3 is a flowchart exemplary showing a process flow in the electronic-album displaying system 10 according to an embodiment of the present invention. In this example, it is assumed that the DVD-Video disk 100 is already inserted into the DVD-Video playback device 110. At first, the remote controlling unit 134 remotely controls the DVD-Video playback device 110 in order to start playing the video stream stored on the DVD-Video disk 100 by means of the DVD-Video playback device 110 (S1000). For example, the remote controlling unit 134 transmits an infrared signal to indicate the start of playback to the DVD-Video playback device 110 to start playing the video stream.

Then, the electronic-album displaying system 10 repeats the following process with respect to each of at least some images according to playback sequence of at least some images among the plurality of images included in the electronic album, which is determined by the schedule stored on the memory card 132 (S1010).

At first, the remote controlling unit 134 remotely controls the DVD-Video playback device 110 in order to change the playback position of the video stream in the DVD-Video playback device 110 into the position of that image indicated by the schedule stored on the memory card 132 (S1020). Particularly, the remote controlling unit 134 remotely controls the DVD-Video playback device 110 in order to change the playback position of the video stream into the head position of the chapter in which that image is included and that is indicated by the schedule stored on the memory card 132. For example, the remote controlling unit 134 transmits an infrared signal to indicate that the playback position is changed to the head position of the chapter to the to DVD-Video playback device 110 so as to change the playback position of the video stream into a desired chapter. Here, the remote controlling unit 134 may change the playback position into any chapter, or may change the playback position into the previous chapter or the next chapter. In this way, the remote controlling unit 134 causes the DVD-Video playback device 110 to play that image in order to cause the display unit 140 to display that image.

Moreover, the DVD-Video playback device 110 may continue the playback of the video stream as usual when it is not remotely controlled by the remote controlling unit 134. Thereby, although a radio communication signal from the remote controlling unit 134 does not arrive at the DVD-Video playback device 110 temporarily, the electronic-album displaying system 10 can continue to display the slide show without interrupting the display of the slide show. Moreover, in this way, when the chapters in which two images to be displayed back and forth are respectively included are similarly located back and forth in the schedule stored on the memory card 132, the electronic-album displaying system 10 can display the images according to the schedule even if the remote controlling unit 134 does not remotely control the DVD-Video playback device 110. In addition, the remote controlling unit 134 may change the playback of the video stream into the other position in the chapter instead of the head position of the chapter in which that image is included.

Next, the remote control unit 134 remotely controls the DVD-Video playback device 110 to pause the playback of the video stream after that image has been played by the DVD-Video playback device 110 (S1030). For example, the remote controlling unit 134 transmits an infrared signal to indicate pause of the playback to the DVD-Video playback device 110 to pause the playback of the video stream. Then, after the remote controlling unit 134 causes the DVD-Video playback device 110 to pause the playback of the video stream, the remote controlling unit 134 decides whether playback duration of that image indicated by the schedule stored on the memory card 132 has elapsed (S1040). When the remote controlling unit 134 decides that the playback duration has not elapsed (S1040: No), the electronic-album displaying system 10 returns the process to the step S1040 and causes the remote controlling unit 134 to decide whether the playback duration has elapsed once more. On the other hand, when it is decided that the playback duration has elapsed, i.e., when it is decided that a pause state has been continued for the playback duration in the DVD-Video playback device 110 (S1040: Yes), the remote controlling unit 134 cancels the pause of the playback of the video stream in the DVD-Video playback device 110 (S1050). Particularly, the remote controlling unit 134 transmits an infrared signal to indicate the cancel of the pause of the playback to the DVD-Video playback device 110 to cancel the pause of the playback of the video stream.

Then, the electronic-album displaying system 10 repeats the above-mentioned process with respect to each of at least some images among the plurality of images included in the electronic album (S1060).

According to the electronic-album displaying system 10 of an embodiment of the present invention, it is possible to sequentially display the images included in the electronic album as the slide show with a configuration and sequence different from the configuration and sequence in the video stream by sequentially changing the playback position of the video stream in the DVD-Video playback device 110 according to the schedule stored on the memory card 132.

Moreover, according to the electronic-album displaying system 10 of an embodiment of the present invention, it is possible to display each image in display time different from the predetermined display time for each image in the video stream by pausing the playback of the video stream and also continuing the pause state for the playback duration indicated by the schedule stored on the memory card 132 after the image displayed as the slide show has been played.

Furthermore, it is possible to shorten time for which each of the images is included as the frame images in the video stream compared with the display time by pausing the playback of the video stream and continuing to display each of the images. In this way, it is possible to store more images on a DVD-Video disk 100 in comparison with cases where the slide show is displayed without changing the playback position of the video stream or pausing the playback.

In addition, the process flow in the electronic-album displaying system 10 is not limited to the contents shown in the present drawing, and various modifications may be added to the contents shown in the present drawing. For example, the remote controlling unit 134 may cancel the pause of the playback of the video stream after changing the playback position in which the next image should be displayed. In this way, when changing the playback position into the frame image showing the next image after canceling the pause of the playback, it is possible to prevent the playback of improper frame image showing another image even if a video stream having short recording time for each image is used. Moreover, when the DVD-Video playback device 110 automatically cancels the pause of the playback with the change of the playback position of the video stream, the remote controlling unit 134 may not cancel the pause of the playback. Moreover, for example, as in the case where the pause of the playback is registered as a post command that is realized after playing PGC (program chain) within the chapter in which each of the plurality of images included in the electronic album is included, when the video stream has been created in order to pause the playback of the video stream by the DVD-Video playback device 110 after each image has been played, the remote controlling unit 134 may not remotely control the DVD-Video playback device 110 in order to pause the playback of the video stream.

Figure 4:
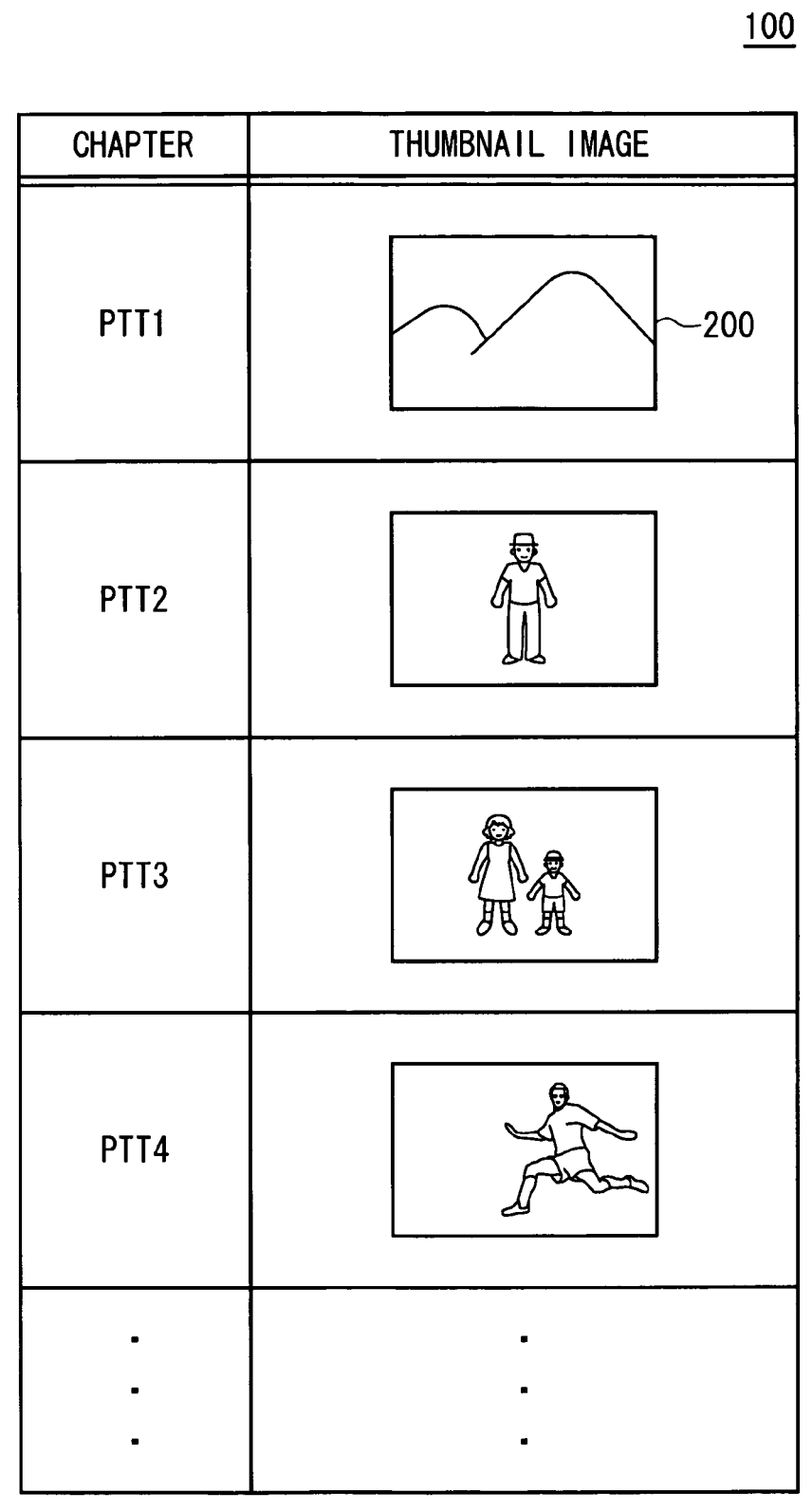

FIG. 4 is a view exemplary showing information stored on the DVD-Video disk 100 according to an embodiment of the present invention. The DVD-Video disk 100 further stores information shown in the following in addition to the video stream. The DVD-Video disk 100 stores information to indicate the position of that image in the video stream, particularly information to indicate the chapter in which that image is included with respect to each of the plurality of images included in the electronic album. Moreover, the DVD-Video disk 100 may store a thumbnail image of that image with respect to each of the plurality of images included in the electronic album. For example, in the case of the DVD-Video disk 100 shown in the present drawing, one image among the plurality of images included in the electronic album is included in the first chapter, i.e., PTT as the frame image, and a thumbnail image 200 is stored in association with that image. Moreover, the DVD-Video disk 100 may further store playback time from the predetermined position such as the head position of the video stream to that image with respect to each of the plurality of images included in the electronic album.

Figure 5:
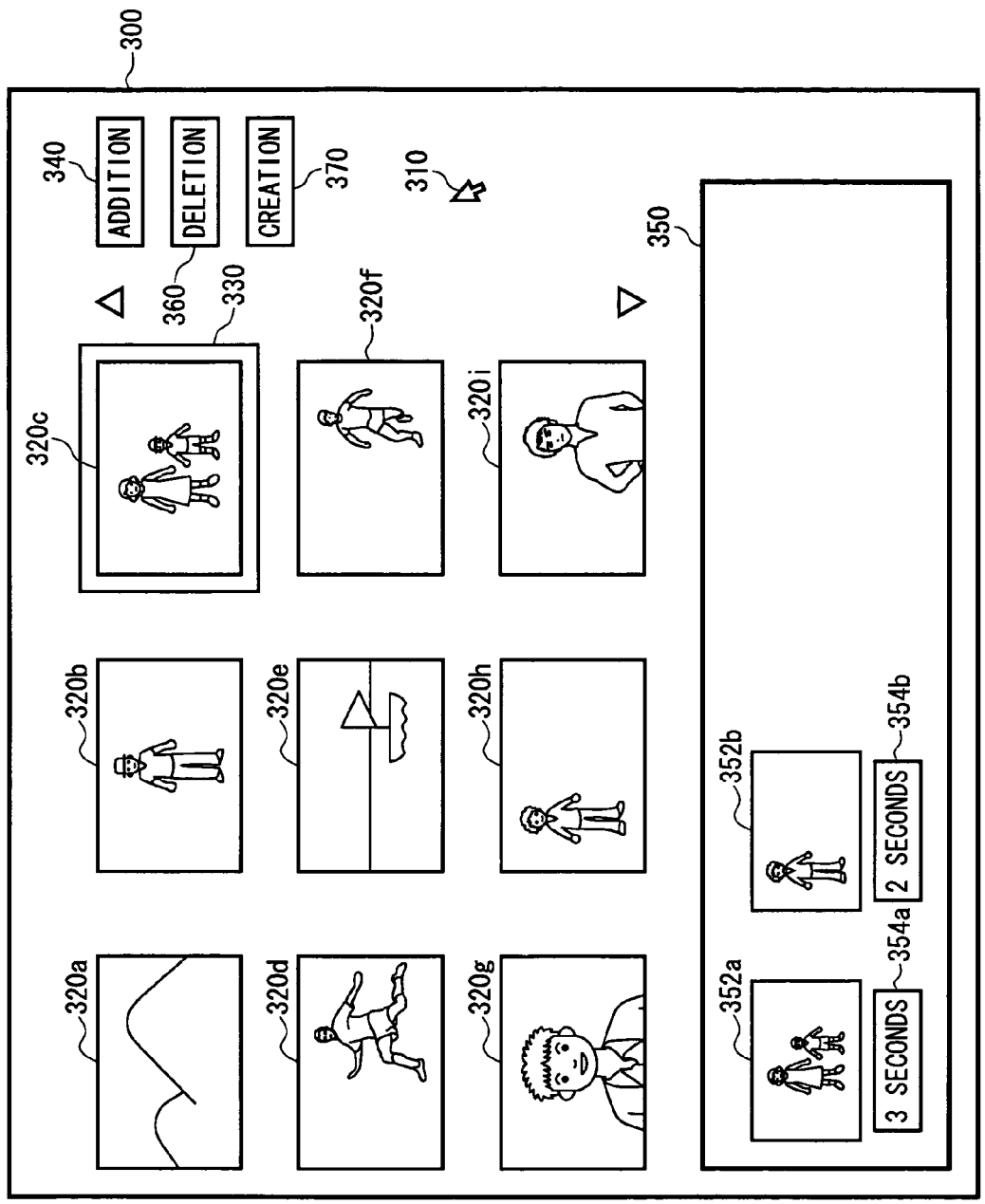
FIG. 5 is a view exemplary showing a screen displayed by a schedule generating device according to an embodiment of the present invention.

Then, the DVD-Video disk 100 may store such information in a directory in which the video stream is stored, particularly a directory different from a VIDEO_TS directory just under a root directory in a file system having UDF (universal disk format) standards. In this way, although the above-mentioned information is further stored on the DVD-Video disk 100, the DVD-Video playback device 110 can normally play the video stream stored on the DVD-Video disk 100. In addition, the above-described information may be stored on a recording medium different from the DVD-Video disk 100. 55 FIG. 5 is a view exemplary showing a screen 300 displayed by the schedule generating device 120 according to an embodiment of the present invention. The user instructs to display the images as the slide show among the plurality of images included in the electronic album, display sequence of the images, display time for each image, and so on to the schedule generating device 120. Then, the schedule generating device 120 generates a schedule for the slide show with respect to each of the plurality of images included in the electronic album in addition to the instruction from the user based on position information of that image in the video stream stored on the DVD-Video disk 100, particularly information to indicate a chapter in which that image is included. Referring to the present drawing, the process by which the schedule generating device 120 generates a schedule will be explained in detail.

The schedule generating device 120 is a personal computer having a display device such as an LCD panel, and has an operating system including a graphic user interface. Then, the schedule generating device 120 executes an application program by way of the operating system to display the screen 300 on the display device. The screen 300 includes a pointer 310, a plurality of thumbnail images (320a to 320i, hereinafter referred to as 320), a select frame 330, an additional button 340, a display image list 350 including a plurality of thumbnail images (352a and 352b, hereinafter referred to as 352) and display time (354a and 354b, hereinafter referred to as 354) corresponding to the thumbnail images 352, a deletion button 360, and a creation button 370.

The user moves the pointer 310 by means of a pointing device such as a mouse. Then, when selecting and clicking any object within the screen 300, the user moves the pointer 310 in the position of the object and then clicks, e.g., a mouse button to instruct the schedule generating device 120 that which object is an object to be controlled.

At first, the schedule generating device 120 reads a thumbnail image of each of the plurality of images included in the electronic album as shown in FIG. 4 from the DVD-Video disk 100, and displays these images as the plurality of thumbnail images 320 on the screen 300. Then, the user selects any thumbnail images 320 among the plurality of thumbnail images 320. The schedule generating device 120 receives these thumbnail images and displays the select frame 330 that surrounds the thumbnail image 320 selected by the user.

Next, the user clicks the additional button 340. The schedule generating device 120 receives it and registers the thumbnail image 320 surrounded by the select frame 330, i.e., the thumbnail image 320 selected just before in the display image list 350 as the thumbnail image 352. Here, the user selects the display time 354 that is provided in the lower side of the thumbnail image 352, and inputs the value of the display time 354 corresponding to the thumbnail image 352 using input means such as a keyboard included in the schedule generating device 120. Moreover, the user selects any thumbnail images 352 and then clicks the deletion button 360 to be able to delete the thumbnail images 352 from the display image list 350.

In this way, after adding the thumbnail images 352 to the display image list 350, the user clicks the creation button 370 to instruct the schedule generating device 120 of the creation of the schedule. Thereby, the schedule generating device 120 selects each of the images included in the electronic album corresponding to each of the thumbnail images 352 registered in the display image list 350 at that point as images displaying as the slide show. Moreover, the schedule generating device 120 makes the sequence registered in the display image list 350 to be the display sequence of the selected images. Moreover, the schedule generating device 120 acquires information to indicate the chapter, in which each of the selected images is included, from information stored on the DVD-Video disk 100, e.g., as shown in FIG. 4. Moreover, the schedule generating device 120 makes the display time 354 input in association with the thumbnail image 352 corresponding to that image to be the playback duration of that image with respect to each of the selected images. Based on the above-mentioned information, the schedule generating device 120 generates the information to indicate the chapter in which each of the selected images is included and the schedule including the playback duration of that image according to the display sequence of the images, e.g., as shown in FIG. 2.

Then, the schedule generating device 120 stores the generated schedule on the memory card 132. Here, a single schedule or a plurality of schedules may be stored on the memory card 132. When the plurality of schedules is stored on the memory card 132, the electronic-album displaying system 10 may display the slide show according to the schedule selected by the user via the input means provided in the remote controller 130.

According to the electronic-album displaying system 10 of an embodiment of the present invention, the user can arbitrarily create the schedule in the slide show, i.e., a configuration of images to be displayed, a display sequence of images, display time of images, and so on. Moreover, although the video stream is stored on the recording medium that is not rewritable, the user can enjoy the slide show with any schedule by storing the created schedule on a device on which the video stream is not stored, particularly, the memory card 132 instead of keeping the created schedule by the change of the contexts of the video stream. For example, even if the image/images undesirable to the user is/are included in the video stream stored on the DVD-Video disk 100 created by the processing laboratory, the user can enjoy the slide show with the schedule by which that image/images is/are not displayed. Moreover, for example, although the display sequence of the images in the video stream is not chronological order, the user can enjoy the slide show in an appropriate display order.

Furthermore, according to the electronic-album displaying system 10, since the memory card 132 on which the created schedule is stored is exchangeably provided in the remote controller 130, it is possible to display the slide show with a schedule different from every user or every use. For example, although a slide show having images of all the families is stored on one piece of DVD-Video disk 100 as a video stream, it is possible to enjoy the slide show of other schedule according to the name of family using the DVD-Video disk 100, and further to use the schedule different from each other between when seeing the slide show along with the family and when seeing the slide show along with the friends.

In addition, the schedule generating device 120 may be a stand-alone apparatus such as a personal computer, or may be included in the remote controller 130. When the schedule generating device 120 is included in the remote controller 130, the user can instruct the instructions using the input means provided in the remote controller 130 among the display lists of the slide show in order to easily edit the schedule as the image being displayed is deleted from the schedule.

Figure 6:
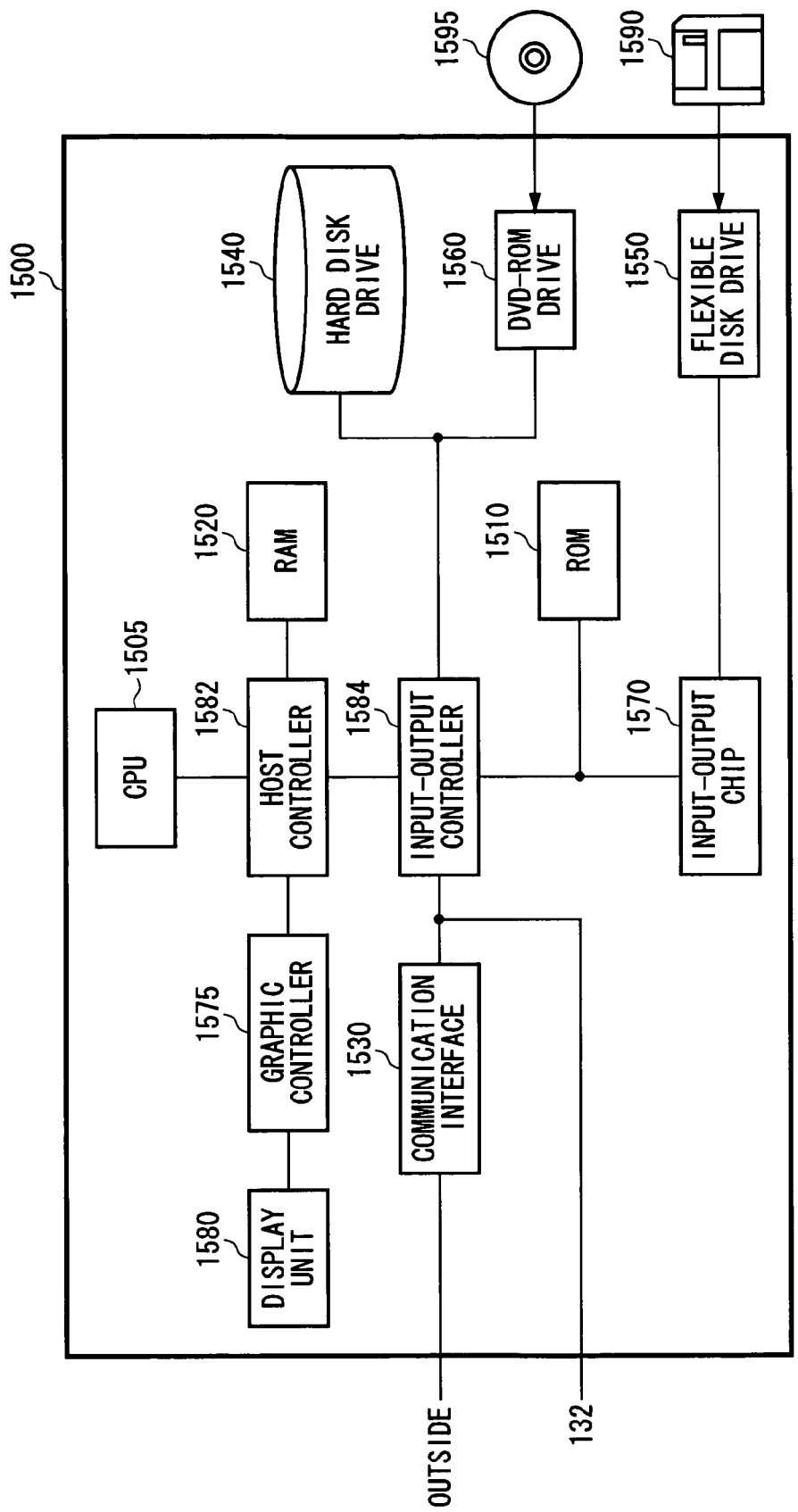
FIG. 6 is a block diagram exemplary showing a hardware configuration of a computer according to an embodiment of the present invention.

FIG. 6 is a block diagram exemplary showing a hardware configuration of the computer 1500 according to an embodiment of the present invention. The computer 1500 according to an embodiment of the present invention includes a CPU peripheral unit having a CPU 1505 interconnected to a host controller 1582, a RAM 1520, a graphic controller 1575, and a display unit 1580, an input-output unit having a communication interface 1530 connected to the host controller 1582 via an input-output controller 1584, a hard disk drive 1540, and a DVD-ROM drive 1560, and a legacy input-output unit having a ROM 1510 connected to the input-output controller 1584, a flexible disk drive 1550, and an input-output chip 1570.

The host controller 1582 connects the RAM 1520 to the CPU 1505 and the graphic controller 1575 that access the RAM 1520 at high transfer rate. The CPU 1505 operates based on a program stored on the ROM 1510 and the RAM 1520 to control each unit. The graphic controller 1575 acquires the image data that the CPU 1520 and the like generate on a frame buffer provided in the RAM 1520 to display it on the display unit 1580. Alternatively, the graphic controller 1575 may include the frame buffer storing the image data generated by the CPU 1505 therein.

The input-output controller 1584 connects the host controller 1582 to the communication interface 1530, the hard disk drive 1540, and the DVD-ROM drive 1560 that are a comparatively high-speed input-output device. Moreover, the input-output controller 1584 is inserted into a slot provided in the computer 1500 to communicate with the memory card 132 connected to the computer 1500, and inputs a program or data from the memory card 132 and also outputs a program or data such as the schedule, which is created in the computer 1500, to the memory card 132. The communication interface 1530 communicates with other apparatuses through a network. The hard disk drive 1540 stores the program and data used by the CPU 1505 within the computer 1500. The DVD-ROM drive 1560 reads the program or data from a DVD-ROM 1595, and provides the program or data to the hard disk drive 1540 via the RAM 1520. Moreover, the DVD-ROM drive 1560 reads the data shown in FIG. 5 from the DVD-Video disk 100, and provides it to the CPU 1505 via the RAM 1520.

Moreover, the input-output controller 1584 is connected to the ROM 1510, and the flexible disk drive 1550 and the input-output chip 1570 that are a comparatively low-speed input-output device. The ROM 1510 stores a boot program executed by the computer 1500 when the computer starts, a program depending upon the hardware of computer 1500, and so on. The flexible disk drive 1550 reads the program or data from a flexible disk 1590, and provides it to the hard disk drive 1540 via the RAM 1520. The input-output chip 1570 connects various input-output devices via the flexible disk drive 1550 and a parallel port, a serial port, a keyboard port, a mouse port, and so on.

A program to be provided to the hard disk drive 1540 via the RAM 1520 is stored on a recording medium such as the flexible disk 1590, the DVD-ROM 1595, or an IC card to be provided by the user. The program is read from the recording medium, is installed in the hard disk drive 1540 in the computer 1500 via the RAM 1520, and is executed in the CPU 1505. The program that is installed and executed in computer 1500 is a schedule generating program that causes the computer 1500 to act as the schedule generating device 120 described by FIG. 1 to FIG. 5 by instructing the CPU 1505 of proper instructions.

Moreover, a program output to the memory card 132 is stored on a recording medium such as the flexible disk 1590, the DVD-ROM 1595, or an IC card to be provided by the user. The program is read from the recording medium, is output to the memory card 132 via the RAM 1520, and is provided to the remote controller 130. The program provided to the remote controller 130 is installed and executed in the remote controller 130. The program that is installed and executed in the remote controller 130 causes the remote controller 130 to act as the remote controller 130 described by FIG. 1 to FIG. 5. In addition, the program provided to the remote controller 130 is not limited to the configuration shown in the present drawing, and may be provided to the remote controller 130 in the other configuration.

The above-described program may be stored on outside storage media. It is possible to use an optical recording medium such as a CD or a PD, a magneto-optical recording medium such as an MD, a tape medium, a semiconductor memory such as an IC card, and so on in addition to the flexible disk 1590 and the DVD-ROM 1595 as the storage media. Moreover, a storage device such as a hard disk or a RAM that is provided in a server system connected to a private telecommunication network and an Internet may be used as a recording medium and a program may be provided to the computer 1500 via the network.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. An electronic-album displaying system that displays an electronic album including a plurality of images, comprising:
a video stream storing unit operable to store a video stream including the plurality of images as frame images;
a playback unit operable to play the video stream;
a remote controller operable to remotely control said playback unit by way of radio communication; and
a display unit operable to display the video stream played by said playback unit, wherein
said remote controller comprises:
a schedule storing unit that stores a schedule by which at least some images among the plurality of images are played; and
a remote controlling unit that remotely controls said playback unit in order to play each of at least some images according to the schedule.

2. The electronic-album displaying system as claimed in claim 1, wherein
the schedule storing unit stores information, which indicates playback sequence of at least some images and a position of each of at least some images in the video stream, as the schedule, and
the remote controlling unit remotely controls said playback unit in order to sequentially change a playback position of the video stream on said playback unit into the position of each of at least some images according to the playback sequence.

3. The electronic-album displaying system as claimed in claim 1, wherein
the schedule storing unit stores thereon playback duration, which is time for which said playback unit continues to play that image with respect to each of at least some images, as the schedule, and
the remote controlling unit remotely controls said playback unit in order to temporarily pause the playback of video stream after that image has been played and also continue a pause state for the playback duration of that image with respect to each of at least some images.

4. The electronic-album displaying system as claimed in claim 1, wherein
the schedule storing unit is exchangeably provided in said remote controller.

5. The electronic-album displaying system as claimed in claim 1, wherein
said video stream storing unit is a recording medium that is not rewritable, and
the schedule storing unit is a recording medium that is rewritable.

6. The electronic-album displaying system as claimed in claim 1, wherein
said video stream storing unit is a DVD-Video disk that stores the video stream in a MPEG2 format, and
said playback unit is a DVD-Video playback device that plays the DVD-Video disk.

7. The electronic-album displaying system as claimed in claim 6, wherein
the schedule storing unit stores information, which indicates playback sequence of at least some images and a chapter in which each of at least some images is included, as the schedule, and
the remote controlling unit remotely controls said playback unit in order to sequentially change a playback position of the video stream on said playback unit into the chapter position in which each of at least some images is included according to the playback sequence.

8. The electronic-album displaying system as claimed in claim 1, wherein
said video stream storing unit further stores information to indicate a position of each of the plurality of images on the video stream, and
the electronic-album displaying system further comprises a schedule generating device operable to generate the schedule based on the information to indicate the location of each of the plurality of images stored on said video stream storing unit.

9. The electronic-album displaying system as claimed in claim 6, wherein
said video stream storing unit further stores information to indicate a chapter in which each of the plurality of images is included, and
the electronic-album displaying system further comprises a schedule generating device operable to generate the schedule based on the information to indicate the chapter in which each of the plurality of images is included.

10. An electronic-album displaying method of displaying an electronic album including a plurality of images, comprising:
playing a video stream including the plurality of images as frame images by means of a playback unit;
remotely controlling the playback unit by radio communication by means of a remote controller; and
displaying the video stream played at the playback step, wherein
said remotely controlling step comprises remotely controlling the playback unit in order to play each of at least some images according to a schedule that is stored on a schedule storing unit of the remote controller and by which at least some images among the plurality of images are played.

11. A remote controller that remotely controls a playback unit playing a video stream by way of radio communication, wherein
the video stream includes a plurality of images as frame images, and
the remote controller comprises:
a schedule storing unit that stores a schedule by which at least some images among the plurality of images are played; and
a remote controlling unit that remotely controls the playback unit in order to play each of at least some images according to the schedule.

12. A machine readable medium storing a remote control program that causes a remote controller to remotely control a playback unit playing a video stream by way of radio communication, wherein
the video stream includes a plurality of images as frame images, and
the program causes the remote controller to act as the remote controller comprising:
a schedule storing unit that stores a schedule by which at least some images among the plurality of images are played; and
a remote controlling unit that remotely controls the playback unit in order to play each of at least some images according to the schedule.

13. A schedule generating device that generates a schedule by which a video stream stored on a video stream storing unit is played, wherein
the video stream includes a plurality of images as frame images, and
a remote controller comprises a schedule storing unit that stores the schedule by which at least some images among the plurality of images are played,
the video stream storing unit further stores information to indicate a position each of the plurality of images on the video stream, and
the schedule generating device generates the schedule that should be stored on the schedule storing unit and by which at least some images among the plurality of images are played without changing the video stream based on the information that is stored on the video stream storing unit and indicates the position each of the plurality of images.

14. A machine readable medium storing a schedule generating program that causes a computer to act as a schedule generating device that generates a schedule by which a video stream stored on a video stream storing unit is played, wherein
the video stream includes a plurality of images as frame images, and
a remote controller comprises a schedule storing unit that stores the schedule by which at least some images among the plurality of images are played,
the video stream storing unit further stores information to indicate a position each of the plurality of images on the video stream, and
the schedule generating program causes the computer to act as the schedule generating device that generates the schedule that should be stored on the schedule storing unit and by which at least some images among the plurality of images are played without changing the video stream based on the information that is stored on the video stream storing unit and indicates the position each of the plurality of images.

* * * * *